US012568558B2

(12) United States Patent
Moriuchi

(10) Patent No.: US 12,568,558 B2
(45) Date of Patent: Mar. 3, 2026

(54) HEAT EXCHANGER

(71) Applicant: Tomoegawa Corporation, Tokyo (JP)

(72) Inventor: Hideki Moriuchi, Shizuoka (JP)

(73) Assignee: Tomoegawa Corporation, Tokyo (JP)

( * ) Notice: Subject to any disclaimer, the term of this patent is extended or adjusted under 35 U.S.C. 154(b) by 812 days.

(21) Appl. No.: 17/800,939

(22) PCT Filed: Feb. 5, 2021

(86) PCT No.: PCT/JP2021/004407
§ 371 (c)(1),
(2) Date: Aug. 19, 2022

(87) PCT Pub. No.: WO2021/166697
PCT Pub. Date: Aug. 26, 2021

(65) Prior Publication Data

US 2023/0080550 A1 Mar. 16, 2023

(30) Foreign Application Priority Data

Feb. 19, 2020 (JP) ................................ 2020-026159

(51) Int. Cl.

| | |
|---|---|
| ***F28F 1/40*** | (2006.01) |
| ***F28D 1/04*** | (2006.01) |
| ***F28D 3/02*** | (2006.01) |
| ***F28F 13/00*** | (2006.01) |
| ***F28F 13/06*** | (2006.01) |
| ***H05B 3/42*** | (2006.01) |
| ***H05B 6/10*** | (2006.01) |

(52) U.S. Cl.
CPC ............... *H05B 6/108* (2013.01); *F28D 1/04* (2013.01); *F28D 3/02* (2013.01); *F28F 1/40* (2013.01); *F28F 13/003* (2013.01); *F28F 13/06* (2013.01); *H05B 3/42* (2013.01)

(58) Field of Classification Search
CPC .............. F28D 1/04; F28F 1/40; F28F 13/003
See application file for complete search history.

(56) References Cited

U.S. PATENT DOCUMENTS 3,289,756 A * 12/1966 Jaeger .................. F28F 13/003
29/890.036
3,704,748 A * 12/1972 Hapgood ............. F28F 13/003
122/501

(Continued)

FOREIGN PATENT DOCUMENTS

CA 3092196 A1 * 8/2019 ............... A24D 1/14
CN 1243503 C 3/2006

(Continued)

OTHER PUBLICATIONS

JP_2004279021_A_H_Translation (Year: 2004).*

(Continued)

*Primary Examiner* — Woody A Lee, Jr.
(74) *Attorney, Agent, or Firm* — Renner, Kenner, Greive, Bobak, Taylor & Weber

(57) ABSTRACT

A heat exchanger includes a metal fiber structure (20) formed from metal fibers, and a housing body (for example, a pipe (10)) in which the metal fiber structure (20) is housed, and a gap is formed at least partially between the metal fiber structure (20) housed in the housing body and an inner surface of the housing body.

8 Claims, 4 Drawing Sheets

(56) References Cited

U.S. PATENT DOCUMENTS

| | | | | | |
|---|---|---|---|---|---|
| 4,108,241 | A * | 8/1978 | Fortini | F02K 9/64 165/169 |
| 5,322,116 | A * | 6/1994 | Galloway | F28F 13/003 110/302 |
| 5,405,586 | A * | 4/1995 | Koves | B01J 8/0207 165/157 |
| 5,773,798 | A | 6/1998 | Fukumura | |
| 9,599,404 | B2 | 3/2017 | Johnson | |
| 2015/0320116 | A1* | 11/2015 | Bleloch | A24F 40/44 219/628 |
| 2019/0380175 | A1 | 12/2019 | Takei et al. | |

FOREIGN PATENT DOCUMENTS

| | | | | | |
|---|---|---|---|---|---|
| CN | 107708453 | A | * | 2/2018 | H05B 6/36 |
| CN | 110024481 | A | | 7/2019 | |
| CN | 119063461 | A | * | 12/2024 | H05B 6/42 |
| DE | 2440563 | A | * | 8/1974 | H05B 6/108 |
| EP | 2508374 | A1 | * | 10/2012 | F24H 6/00 |
| EP | 3361828 | A1 | * | 8/2018 | H05B 6/108 |
| EP | 3361828 | B1 | | 3/2019 | |
| EP | 3547798 | A1 | * | 10/2019 | H05B 6/108 |
| GB | 1562905 | A | * | 3/1980 | H05B 6/108 |
| JP | S60-2240 | U1 | | 1/1985 | |
| JP | 9-283268 | A | | 10/1997 | |
| JP | 2003123949 | A | | 4/2003 | |
| JP | 2004279021 | A | * | 10/2004 | F28F 1/40 |
| JP | 2018085226 | A1 | | 5/2018 | |
| JP | 2021532797 | A | * | 12/2021 | A24F 40/465 |
| WO | WO-9613138 | A1 | * | 5/1996 | H05B 6/02 |
| WO | WO-2013102609 | A2 | * | 7/2013 | H05B 6/108 |
| WO | WO-2017186455 | A1 | * | 11/2017 | A24F 40/42 |
| WO | WO-2021182086 | A1 | * | 9/2021 | B22F 1/00 |
| WO | WO-2021189799 | A1 | * | 9/2021 | H05B 6/365 |
| WO | WO-2021246644 | A1 | * | 12/2021 | A24F 40/51 |

OTHER PUBLICATIONS

ESSR for Application 21756195.0-1202/4110010 PCT/JP2021004407 on Jun. 7, 2023.

International Search Report dated Apr. 6, 2021 for PCT/JP2021/004407.

Office Action issued Jan. 7, 2022, in patent application TW 110105523.

* cited by examiner

HEAT EXCHANGER

TECHNICAL FIELD

The present invention relates to a heat exchanger.

BACKGROUND ART

Hitherto, various types of heat exchangers are known as heat exchangers that cause a fluid as a heat transfer medium to flow in a pipe, thereby heating the fluid or dissipating heat from the fluid. For example, Japanese Laid-Open Patent Publication No. 2003-123949 (JP2003-123949A) discloses an electromagnetic induction heating device that applies electromagnetic induction heating for heating, has good fluid heating efficiency, and for which a conductor to be used is easily produced. In the electromagnetic induction heating device disclosed in Japanese Laid-Open Patent Publication No. 2003-123949 (JP2003-123949A), a honeycomb structure material formed from metal fibers is disposed inside a metal pipe. Also, Japanese Laid-Open Patent Publication No. 2019-172275 (JP2019-172275A) discloses a cooling member having a metal fiber sheet made of metal fibers and a cooling mechanism for cooling the metal fiber sheet.

SUMMARY OF THE INVENTION

In the conventional heat exchanger, a metal fiber structure formed from metal fibers is generally adhered to the inner surface of a pipe through which a fluid as a heat transfer medium flows. However, in such a heat exchanger, turbulent flow is less likely to be generated in the fluid flowing through the pipe, and in this case, there is a problem that the staying time of the fluid flowing through the pipe is shortened, resulting in a decrease in thermal conduction properties.

The present invention has been made in consideration of such circumstances, and an object of the present invention is to provide a heat exchanger capable of enhancing thermal conduction properties for a fluid flowing inside a housing body in which a metal fiber structure is housed.

A heat exchanger of the present invention includes: a metal fiber structure formed from metal fibers; and a housing body in which the metal fiber structure is housed, and a gap is formed at least partially between the metal fiber structure housed in the housing body and an inner surface of the housing body.

DESCRIPTION OF THE PREFERRED EMBODIMENTS

Figure 1:
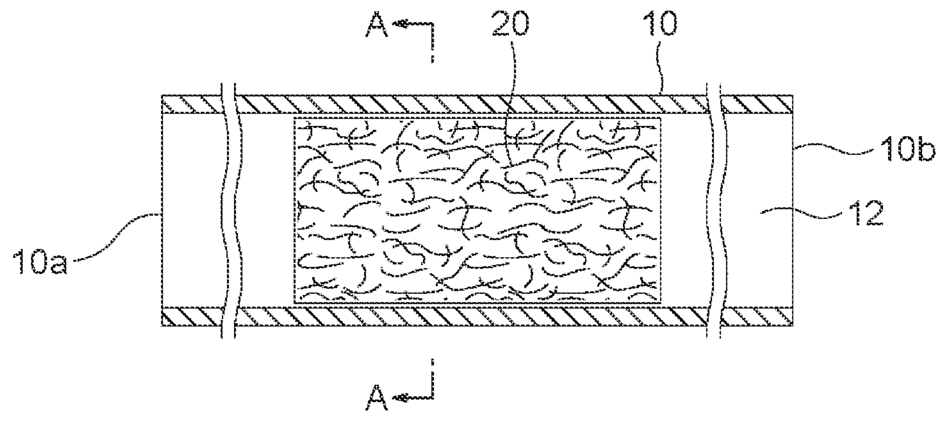
FIG. 1 is a cross-sectional view showing an example of the configuration of a heat exchanger according to an embodiment of the present invention.

Hereinafter, an embodiment of the present invention will be described with reference to the drawings. FIG. 1 to FIG. 9 are cross-sectional views showing various examples of a heat exchanger according to the present embodiment. The heat exchanger according to the present embodiment causes a fluid as a heat transfer medium to flow in a pipe, thereby heating the fluid or dissipating heat from the fluid.

First, the heat exchanger shown in FIG. 1 and FIG. 2 will be described. The heat exchanger shown in FIG. 1 and FIG. 2 includes a pipe 10 having a cylindrical shape and having a circular cross-section, and a metal fiber structure 20 having a substantially columnar shape and disposed inside the pipe 10. A fluid (specifically, liquid or gas) as a heat transfer medium flows through a flow passage 12 formed inside the pipe 10. More specifically, an inlet 10*a* and an outlet 10*b* for the fluid are formed at both ends of the pipe 10, respectively, and the fluid entering the inside of the pipe 10 through the inlet 10*a* passes through the flow passage 12 and is discharged from the outlet 10*b*.

The pipe 10 serves as a housing body in which the metal fiber structure 20 is housed. The pipe 10 is made of, for example, a metal selected from the group consisting of stainless steel, iron, copper, aluminum, bronze, brass, nickel, chromium, and the like.

The metal fiber structure 20 is formed from metal fibers. Metal-coated fibers may be used as such metal fibers. In addition, the metal fiber structure 20 may be a metal fiber structure into which a nonwoven fabric, a woven fabric, a mesh, or the like formed by using a wet or dry process is processed. Preferably, a metal fiber nonwoven fabric in which metal fibers are bonded together is used as the metal fiber structure 20. The metal fibers being bonded together means that the metal fibers are physically fixed to each other to form bonded portions. In the metal fiber structure 20, the metal fibers may be directly fixed to each other at bonded portions, or parts of the metal fibers may be indirectly fixed to each other via a component other than the metal component.

Since the metal fiber structure 20 is formed from metal fibers, voids exist inside the metal fiber structure 20. Accordingly, the fluid flowing through the flow passage 12 in the pipe 10 can pass through the inside of the metal fiber structure 20. In addition, in the case where the metal fibers are bonded together in the metal fiber structure 20, voids are more easily formed between the metal fibers forming the metal fiber structure 20. Such voids may be formed, for example, by entangling the metal fibers. Since the metal fiber structure 20 has such voids, the fluid flowing through the flow passage 12 of the pipe 10 is introduced into the inside of the metal fiber structure 20, so that the heat exchange performance for the fluid is easily enhanced. In addition, in the metal fiber structure 20, the metal fibers are preferably sintered at the bonded portions. When the metal fibers are sintered, the thermal conduction properties and the homogeneity of the metal fiber structure 20 are easily stabilized.

A specific example of the metal forming the metal fibers included in the metal fiber structure 20 is not limited, and may be selected from the group consisting of stainless steel, iron, copper, aluminum, bronze, brass, nickel, chromium, and the like, or may be a noble metal selected from the group consisting of gold, platinum, silver, palladium, rhodium, iridium, ruthenium, osmium, and the like. Among them, copper fibers and aluminum fibers are preferable since these fibers have excellent thermal conduction properties and moderate balance between rigidity and plastic deformability.

The material of the metal fibers forming the metal fiber structure 20 and the material of the pipe 10 are preferably different from each other. Specifically, whereas the metal fibers forming the metal fiber structure 20 may be copper fibers, the material of the pipe 10 may be aluminum.

Figure 2:
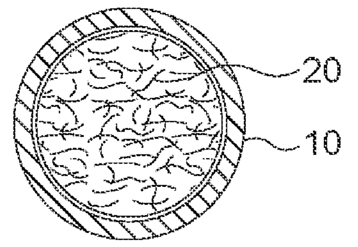
FIG. 2 is a cross-sectional view of the heat exchanger shown in FIG. 1, taken along a line A-A.

As shown in FIG. 1 and FIG. 2, a gap is formed at least partially between the metal fiber structure 20 housed in the pipe 10 and the inner surface of the pipe 10. That is, the metal fiber structure 20 exists inside the pipe 10 in a state where the metal fiber structure 20 is not bonded to the inner surface of the pipe 10. Therefore, the metal fiber structure 20 is freely movable inside the pipe 10 along the flowing direction of the fluid. In the present embodiment, the fluid flowing through the flow passage 12 in the pipe 10 can pass through the gap formed between the metal fiber structure 20 and the inner surface of the pipe 10. In addition, even when the metal fiber structure 20 moves inside the pipe 10, since the metal fiber structure 20 is made of metal fibers and has cushioning properties, the inner surface of the pipe 10 can be inhibited from being damaged by the metal fiber structure 20. In particular, the hardness of the material of the pipe 10 is preferably larger than the hardness of the material of the metal fiber structure 20. In this case, even when the metal fiber structure 20 moves inside the pipe 10, the inner surface of the pipe 10 can be further inhibited from being damaged by the metal fiber structure 20.

The size of the gap between the metal fiber structure 20 housed in the pipe 10 and the inner surface of the pipe 10 is in the range of 10 μm to 500 μm, preferably in the range of 30 μm to 300 μm, and further preferably in the range of 50 μm to 200 μm. The size of the gap between the metal fiber structure 20 housed in the pipe 10 and the inner surface of the pipe 10 refers to the distance between the pipe 10 and the metal fiber structure 20 in a direction orthogonal to the inner surface of the pipe 10. When the size of the gap is set to be not less than 10 μm, an increase in pressure loss can be prevented, so that it can be prevented from being difficult for the fluid to pass through the gap. On the other hand, when the size of the gap is set to be not greater than 500 μm, the fluid can be prevented from flowing through the gap without resistance, so that the heat exchange performance can be enhanced.

In the heat exchanger of the present embodiment configured as described above, the gap is formed at least partially between the metal fiber structure 20 housed in the pipe 10 as a housing body and the inner surface of the pipe 10. Therefore, the surface area of the metal fiber structure 20 with which the fluid flowing through the pipe 10 comes into contact is increased, so that the thermal conductivity of the metal fiber structure 20 can be increased. In the case where the metal fiber structure 20 is made of randomly arranged short metal fibers, it is easy to generate turbulent flow in the fluid flowing through the pipe 10. In this case, the staying time of the fluid flowing through the pipe 10 can be lengthened, so that the heat transfer effect can be enhanced. In addition, the temperature of the fluid flowing through the pipe 10 can be made uniform (for example, the temperatures at a center portion of the pipe 10 and near the inner wall of the pipe 10 can be made uniform). In the case where a gap is formed at least partially between the metal fiber structure 20 and the inner surface of the pipe 10 as described above, the thermal conductivity of the metal fiber structure 20 can be increased, and the staying time of the fluid flowing through the pipe 10 can be lengthened, thereby enhancing the heat transfer effect, so that the thermal conduction properties for the fluid can be enhanced. In the case where the metal fiber structure 20 is completely separated from the pipe 10, even when such a configuration is applied to a heat exchanger that repeatedly performs rapid heating and rapid cooling, the metal fiber structure 20 does not follow expansion and contraction of the pipe 10, so that the metal fiber structure 20 can be inhibited from being damaged. In addition, in the case where a gap is formed at least partially between the metal fiber structure 20 and the inner surface of the pipe 10, it is easy to release the internal pressure due to the fluid flowing through the pipe 10.

In the case where a metal structure is simply housed inside the pipe 10, if a gap is formed between the metal structure and the inner surface of the pipe 10, the inner surface of the pipe 10 may be damaged by the metal structure when the metal structure moves inside the pipe 10. On the other hand, as described above, since the metal fiber structure 20 is made of metal fibers and has cushioning properties, the inner surface of the pipe 10 can be inhibited from being damaged by the metal fiber structure 20.

Moreover, in the heat exchanger shown in FIG. 1 and FIG. 2, the metal fiber structure 20 is freely movable inside the pipe 10. Therefore, it is easier to generate turbulent flow when the fluid flows through the flow passage 12 of the pipe 10. Accordingly, the staying time of the fluid flowing through the pipe 10 is further lengthened, so that the heat transfer effect can be further enhanced.

Moreover, in the heat exchanger shown in FIG. 1 and FIG. 2, in order to make it easier to generate turbulent flow when the fluid flows through the flow passage 12 of the pipe 10, a blade (not shown) may be attached to an end portion of the metal fiber structure 20. In the case where such a blade is attached, the fluid flowing through the flow passage 12 of the pipe 10 comes into contact with the blade of the metal fiber structure 20, thereby rotating the metal fiber structure 20 inside the pipe 10. Accordingly, it is easier to generate turbulent flow when the fluid flows through the flow passage 12 of the pipe 10.

Moreover, in the heat exchanger shown in FIG. 1 and FIG. 2, only a part of the outer circumferential surface of the metal fiber structure 20 may be attached to the inner surface of the pipe 10 instead of the metal fiber structure 20 being completely separated from the inner surface of the pipe 10. In this case as well, when a gap is formed between the inner surface of the pipe 10 and a portion, of the metal fiber structure 20, which is not attached to the inner surface of the pipe 10, the thermal conductivity of the metal fiber structure 20 can be increased, and the staying time of the fluid flowing through the pipe 10 can be lengthened, thereby enhancing the heat transfer effect, so that the thermal conduction properties for the fluid can be enhanced.

The heat exchanger according to the present embodiment is not limited to the one shown in FIG. 1 and FIG. 2. Another example of the heat exchanger according to the present embodiment will be described with reference to FIG. 3 and FIG. 4.

Figure 3:
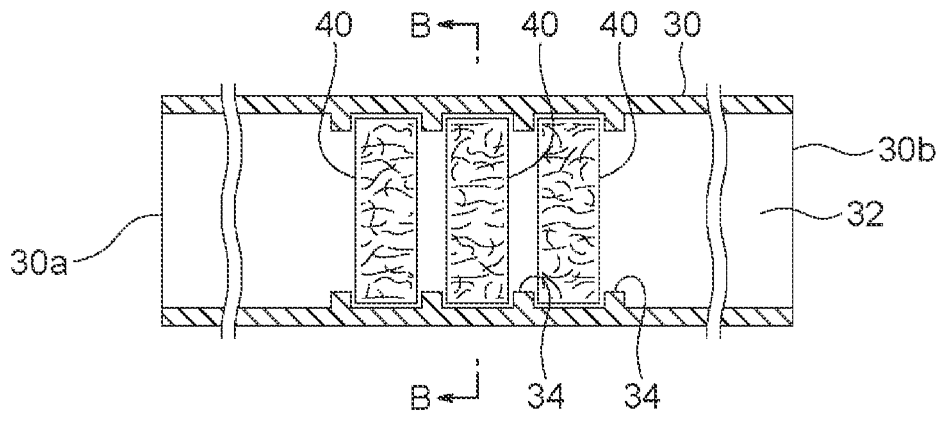
FIG. 3 is a cross-sectional view showing another example of the configuration of the heat exchanger according to the embodiment of the present invention.
Figure 4:
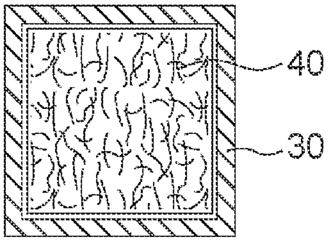
FIG. 4 is a cross-sectional view of the heat exchanger shown in FIG. 3, taken along a line B-B.

The heat exchanger shown in FIG. 3 and FIG. 4 includes a pipe 30 having a substantially square cross-section, and a plurality of (three in the example shown in FIG. 3 and FIG.

4) metal fiber structures 40 each having a substantially rectangular parallelepiped shape (specifically, for example, a plate shape) and disposed inside the pipe 30. A fluid (specifically, liquid or gas) as a heat transfer medium flows through a flow passage 32 formed inside the pipe 30. More specifically, an inlet 30*a* and an outlet 30*b* for the fluid are formed at both ends of the pipe 30, respectively, and the fluid entering the inside of the pipe 30 through the inlet 30*a* passes through the flow passage 32 and is discharged from the outlet 30*b*. The pipe 30 serves as a housing body in which each metal fiber structure 40 is housed. As the metal forming the pipe 30, the same type as the metal forming the pipe 10 shown in FIG. 1 and FIG. 2 is used. In addition, as the metal fibers forming each metal fiber structure 40, the same type as the metal fibers forming the metal fiber structure 20 shown in FIG. 1 and FIG. 2 is used. Since each metal fiber structure 40 is formed from metal fibers as described above, voids exist inside each metal fiber structure 40. Accordingly, the fluid flowing through the flow passage 32 in the pipe 30 can pass through the inside of each metal fiber structure 40.

In the heat exchanger shown in FIG. 3 and FIG. 4, retaining members 34 are provided in order to retain each metal fiber structure 40 at a predetermined position. Such retaining members 34 are, for example, projections formed on the inner surface of the pipe 30. Since such retaining members 34 are provided, each metal fiber structure 40 does not move to a large extent inside the pipe 30 along the flowing direction of the fluid as compared to the heat exchanger shown in FIG. 1 and FIG. 2.

Moreover, as shown in FIG. 3 and FIG. 4, a gap is formed at least partially between each metal fiber structure 40 housed in the pipe 30 and the inner surface of the pipe 30. That is, each metal fiber structure 40 exists inside the pipe 30 in a state where the metal fiber structure 40 is not bonded to the inner surface of the pipe 30. Accordingly, the fluid flowing through the flow passage 32 in the pipe 30 can pass through the gap formed between each metal fiber structure 40 and the inner surface of the pipe 30. In addition, although each metal fiber structure 40 is retained at a predetermined position inside the pipe 30 by the retaining members 34, since the gap is formed at least partially between each metal fiber structure 40 and the inner surface of the pipe 30, each metal fiber structure 40 may move slightly. However, since each metal fiber structure 40 is made of metal fibers and has cushioning properties, the inner surface of the pipe 30 can be inhibited from being damaged by each metal fiber structure 40.

The size of the gap between each metal fiber structure 40 housed in the pipe 30 and the inner surface of the pipe 30 is in the range of 10 μm to 500 μm, preferably in the range of 30 μm to 300 μm, and further preferably in the range of 50 μm to 200 μm. The size of the gap between each metal fiber structure 40 housed in the pipe 30 and the inner surface of the pipe 30 refers to the distance between the pipe 30 and each metal fiber structure 40 in a direction orthogonal to the inner surface of the pipe 30. When the size of the gap is set to be not less than 10 μm, an increase in pressure loss can be prevented, so that it can be prevented from being difficult for the fluid to pass through the gap. On the other hand, when the size of the gap is set to be not greater than 500 μm, the fluid can be prevented from flowing through the gap without resistance, so that the heat exchange performance can be enhanced.

In the heat exchanger of the present embodiment shown in FIG. 3 and FIG. 4 as well, similar to the heat exchanger shown in FIG. 1 and FIG. 2, the gap is formed at least partially between each metal fiber structure 40 housed in the pipe 30 as a housing body and the inner surface of the pipe 30. Therefore, the surface area of each metal fiber structure 40 with which the fluid flowing through the pipe 30 comes into contact is increased, so that the thermal conductivity of each metal fiber structure 40 can be increased. In addition, the temperature of the fluid flowing through the pipe 30 can be made uniform. Moreover, in the case where a gap is formed at least partially between each metal fiber structure 40 and the inner surface of the pipe 30, it is easy to generate turbulent flow in the fluid flowing through the pipe 30. In this case, the staying time of the fluid flowing through the pipe 30 is lengthened, so that the heat transfer effect can be enhanced. In the case where a gap is formed at least partially between each metal fiber structure 40 and the inner surface of the pipe 30 as described above, the thermal conductivity of each metal fiber structure 40 can be increased, and the staying time of the fluid flowing through the pipe 30 can be lengthened, thereby enhancing the heat transfer effect, so that the thermal conduction properties for the fluid can be enhanced.

Next, still another example of the heat exchanger according to the present embodiment will be described with reference to FIG. 5.

Figure 5:
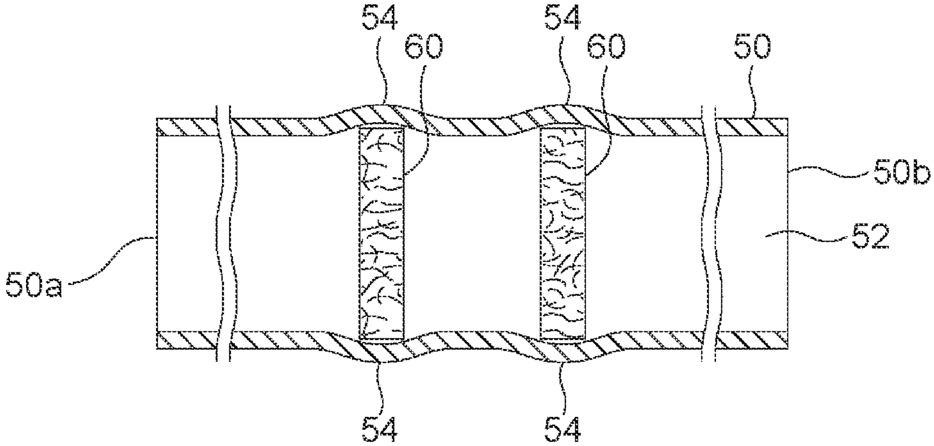
FIG. 5 is a cross-sectional view showing still another example of the configuration of the heat exchanger according to the embodiment of the present invention.

The heat exchanger shown in FIG. 5 includes a pipe 50 having a substantially square cross-section, and a plurality of (two in FIG. 5) metal fiber structures 60 each having a substantially rectangular parallelepiped shape (specifically, for example, a plate shape) and disposed inside the pipe 50. A fluid (specifically, liquid or gas) as a heat transfer medium flows through a flow passage 52 formed inside the pipe 50. More specifically, an inlet 50*a* and an outlet 50*b* for the fluid are formed at both ends of the pipe 50, respectively, and the fluid entering the inside of the pipe 50 through the inlet 50*a* passes through the flow passage 52 and is discharged from the outlet 50*b*. The pipe 50 serves as a housing body in which each metal fiber structure 60 is housed. As the metal forming the pipe 50, the same type as the metal forming the pipe 10 shown in FIG. 1 and FIG. 2 is used. In addition, as the metal fibers forming each metal fiber structure 60, the same type as the metal fibers forming the metal fiber structure 20 shown in FIG. 1 and FIG. 2 is used. Since each metal fiber structure 60 is formed from metal fibers as described above, voids exist inside each metal fiber structure 60. Accordingly, the fluid flowing through the flow passage 52 in the pipe 50 can pass through the inside of each metal fiber structure 60.

In the heat exchanger shown in FIG. 5, in order to retain the respective metal fiber structures 60 at predetermined positions, mountain portions 54 are provided in the pipe 50 such that the cross-sectional areas of parts of the pipe 50 are increased, so that the end edge of each metal fiber structure 60 is held by the mountain portion 54. More specifically, the cross-section of each portion other than the mountain portions 54 in the pipe 50 is smaller than the cross-section of each metal fiber structure 60. Meanwhile, the cross-section of the portion, of the pipe 50, at which each mountain portion 54 is provided is larger than the cross-section of each metal fiber structure 60. Since such mountain portions 54 are provided in the pipe 50, each metal fiber structure 60 does not move to a large extent inside the pipe 50 as compared to the heat exchanger shown in FIG. 1 and FIG. 2.

Moreover, as shown in FIG. 5, a gap is formed at least partially between each metal fiber structure 60 housed in the pipe 50 and the inner surface of the pipe 50. That is, each metal fiber structure 60 exists inside the pipe 50 in a state where the metal fiber structure 60 is not bonded to the inner surface of the pipe 50. Accordingly, the fluid flowing through the flow passage 52 in the pipe 50 can pass through the gap formed between each metal fiber structure 60 and the inner surface of the pipe 50. In addition, although each metal fiber structure 60 is retained at a predetermined position inside the pipe 50 by the mountain portion 54 of the pipe 50, since the gap is formed at least partially between each metal fiber structure 60 and the inner surface of the pipe 50, each metal fiber structure 60 may move slightly. However, since each metal fiber structure 60 is made of metal fibers and has cushioning properties, the inner surface of the pipe 50 can be inhibited from being damaged by each metal fiber structure 60.

The size of the gap between each metal fiber structure 60 housed in the pipe 50 and the inner surface of the pipe 50 is in the range of 10 μm to 500 μm, preferably in the range of 30 μm to 300 μm, and further preferably in the range of 50 μm to 200 μm. The size of the gap between each metal fiber structure 60 housed in the pipe 50 and the inner surface of the pipe 50 refers to the distance between the pipe 50 and each metal fiber structure 60 in a direction orthogonal to the inner surface of the pipe 50. When the size of the gap is set to be not less than 10 μm, an increase in pressure loss can be prevented, so that it can be prevented from being difficult for the fluid to pass through the gap. On the other hand, when the size of the gap is set to be not greater than 500 μm, the fluid can be prevented from flowing through the gap without resistance, so that the heat exchange performance can be enhanced.

In the heat exchanger of the present embodiment shown in FIG. 5 as well, similar to the heat exchanger shown in FIG. 1 and FIG. 2, the gap is formed at least partially between each metal fiber structure 60 housed in the pipe 50 as a housing body and the inner surface of the pipe 50. Therefore, the surface area of each metal fiber structure 60 with which the fluid flowing through the pipe 50 comes into contact is increased, so that the thermal conductivity of each metal fiber structure 60 can be increased. In addition, the temperature of the fluid flowing through the pipe 50 can be made uniform. Moreover, in the case where a gap is formed at least partially between each metal fiber structure 60 and the inner surface of the pipe 50, it is easy to generate turbulent flow in the fluid flowing through the pipe 50. In this case, the staying time of the fluid flowing through the pipe 50 is lengthened, so that the heat transfer effect can be enhanced. In the case where a gap is formed at least partially between each metal fiber structure 60 and the inner surface of the pipe 50 as described above, the thermal conductivity of each metal fiber structure 60 can be increased, and the staying time of the fluid flowing through the pipe 50 can be lengthened, thereby enhancing the heat transfer effect, so that the thermal conduction properties for the fluid can be enhanced.

Next, still another example of the heat exchanger according to the present embodiment will be described with reference to FIG. 6.

Figure 6:
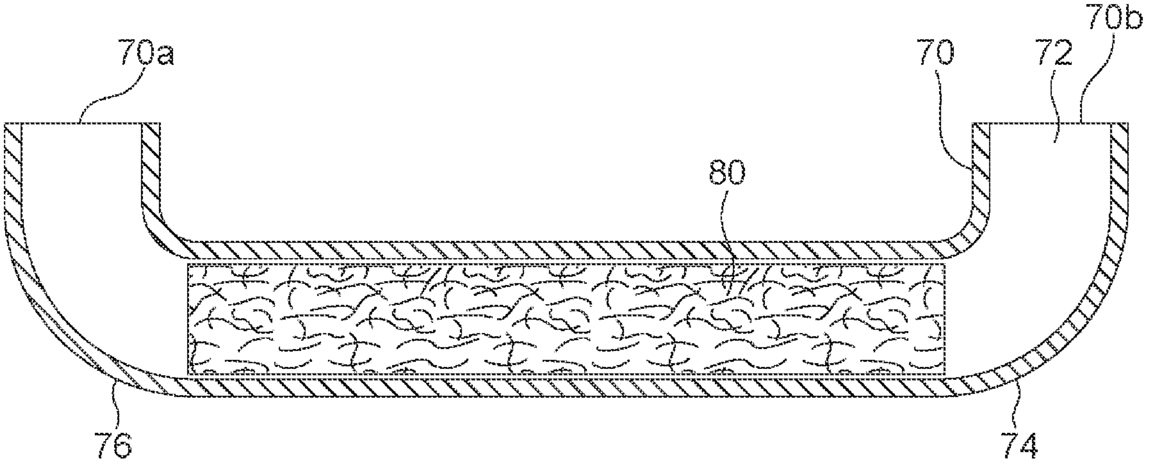
FIG. 6 is a cross-sectional view showing still another example of the configuration of the heat exchanger according to the embodiment of the present invention.

The heat exchanger shown in FIG. 6 includes a pipe 70 having a circular cross-section and bent at portions near both ends thereof by about 90°, and a metal fiber structure 80 having a substantially columnar shape and disposed inside the pipe 70. A fluid (specifically, liquid or gas) as a heat transfer medium flows through a flow passage 72 formed inside the pipe 70. More specifically, an inlet 70*a* and an outlet 70*b* for the fluid are formed at both ends of the pipe 70, respectively; and the direction of the fluid entering the inside of the pipe 10 through the inlet 70*a* is changed at a bent portion 74, then the fluid passes through the metal fiber structure 80, the direction of the fluid is subsequently changed at a bent portion 76, and the fluid is then discharged from the outlet 70*b*. The pipe 70 serves as a housing body in which the metal fiber structure 80 is housed. As the metal forming the pipe 70, the same type as the metal forming the pipe 10 shown in FIG. 1 and FIG. 2 is used. In addition, as the metal fibers forming the metal fiber structure 80, the same type as the metal fibers forming the metal fiber structure 20 shown in FIG. 1 and FIG. 2 is used. Since the metal fiber structure 80 is formed from metal fibers as described above, voids exist inside the metal fiber structure 80. Accordingly, the fluid flowing through the flow passage 72 in the pipe 70 can pass through the inside of the metal fiber structure 80.

In the heat exchanger shown in FIG. 6, the metal fiber structure 80 is retained at a predetermined position by a pair of the bent portions 74 and 76 of the pipe 70. More specifically, since the bent portion 74 is provided in the pipe 70, the metal fiber structure 80 does not move rightward to a large extent from the position shown in FIG. 6. In addition, since the bent portion 76 is provided in the pipe 70, the metal fiber structure 80 does not move leftward to a large extent from the position shown in FIG. 6. Since the bent portions 74 and 76 are provided in the pipe 70 as described above, the metal fiber structure 80 does not move to a large extent inside the pipe 70 as compared to the heat exchanger shown in FIG. 1 and FIG. 2.

Moreover, as shown in FIG. 6, a gap is formed at least partially between the metal fiber structure 80 housed in the pipe 70 and the inner surface of the pipe 70. That is, the metal fiber structure 80 exists inside the pipe 70 in a state where the metal fiber structure 80 is not bonded to the inner surface of the pipe 70. Accordingly, the fluid flowing through the flow passage 72 in the pipe 70 can pass through the gap formed between the metal fiber structure 80 and the inner surface of the pipe 70. In addition, although the metal fiber structure 80 is retained at a predetermined position inside the pipe 70 by the respective bent portions 74 and 76 of the pipe 70, since the gap is formed at least partially between the metal fiber structure 80 and the inner surface of the pipe 70, the metal fiber structure 80 may move slightly. However, since the metal fiber structure 80 is made of metal fibers and has cushioning properties, the inner surface of the pipe 70 can be inhibited from being damaged by the metal fiber structure 80.

The size of the gap between the metal fiber structure 80 housed in the pipe 70 and the inner surface of the pipe 70 is in the range of 10 μm to 500 μm, preferably in the range of 30 μm to 300 μm, and further preferably in the range of 50 μm to 200 μm. The size of the gap between the metal fiber structure 80 housed in the pipe 70 and the inner surface of the pipe 70 refers to the distance between the pipe 70 and the metal fiber structure 80 in a direction orthogonal to the inner surface of the pipe 70. When the size of the gap is set to be not less than 10 μm, an increase in pressure loss can be prevented, so that it can be prevented from being difficult for the fluid to pass through the gap. On the other hand, when the size of the gap is set to be not greater than 500 μm, the fluid can be prevented from flowing through the gap without resistance, so that the heat exchange performance can be enhanced.

In the heat exchanger of the present embodiment shown in FIG. 6 as well, similar to the heat exchanger shown in FIG. 1 and FIG. 2, the gap is formed at least partially between the metal fiber structure 80 housed in the pipe 70 as a housing body and the inner surface of the pipe 70. Therefore, the surface area of the metal fiber structure 80 with which the fluid flowing through the pipe 70 comes into contact is increased, so that the thermal conductivity of the metal fiber structure 80 can be increased. In addition, the temperature of the fluid flowing through the pipe 70 can be made uniform. Moreover, in the case where a gap is formed at least partially between the metal fiber structure 80 and the inner surface of the pipe 70, it is easy to generate turbulent flow in the fluid flowing through the pipe 70. In this case, the staying time of the fluid flowing through the pipe 70 is lengthened, so that the heat transfer effect can be enhanced. In the case where a gap is formed at least partially between the metal fiber structure 80 and the inner surface of the pipe 70 as described above, the thermal conductivity of the metal fiber structure 80 can be increased, and the staying time of the fluid flowing through the pipe 70 can be lengthened, thereby enhancing the heat transfer effect, so that the thermal conduction properties for the fluid can be enhanced.

Next, still another example of the heat exchanger according to the present embodiment will be described with reference to FIG. 7 to FIG. 9.

Figure 7:
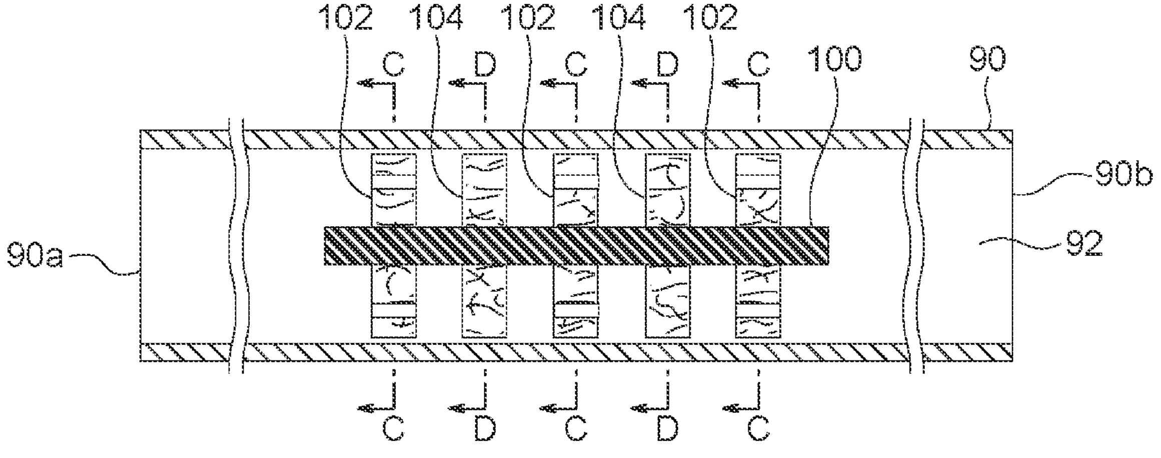
FIG. 7 is a cross-sectional view showing still another example of the configuration of the heat exchanger according to the embodiment of the present invention.
Figure 8:
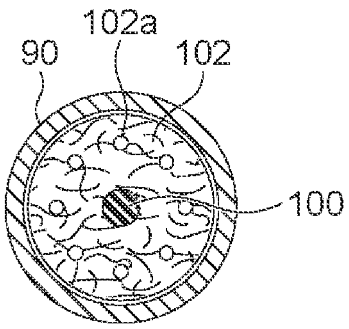
FIG. 8 is a cross-sectional view of the heat exchanger shown in FIG. 7, taken along a line C-C.
Figure 9:
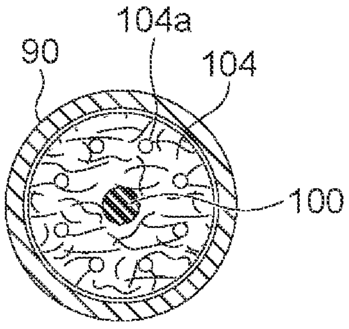
FIG. 9 is a cross-sectional view of the heat exchanger shown in FIG. 7, taken along a line

The heat exchanger shown in FIG. 7 to FIG. 9 includes a pipe 90 having a cylindrical shape and having a circular cross-section, a plurality of (five in the example shown in FIG. 7, etc.) metal fiber structures 102 and 104 having a substantially disc shape and disposed inside the pipe 90, and a rod-shaped connection member 100 connecting the respective metal fiber structures 102 and 104. A fluid (specifically, liquid or gas) as a heat transfer medium flows through a flow passage 92 formed inside the pipe 90. More specifically, an inlet 90*a* and an outlet 90*b* for the fluid are formed at both ends of the pipe 90, respectively, and the fluid entering the inside of the pipe 90 through the inlet 90*a* passes through the flow passage 92 and is discharged from the outlet 90*b*. The pipe 90 serves as a housing body in which the respective metal fiber structures 102 and 104 are housed. As the metal forming the pipe 90, the same type as the metal forming the pipe 10 shown in FIG. 1 and FIG. 2 is used.

The rod-shaped connection member 100 extends through through holes (not shown) formed at the centers of the respective metal fiber structures 102 and 104 having a substantially disc shape, and the respective metal fiber structures 102 and 104 are fixed to the connection member 100. Specifically, the connection member 100 is made of, for example, a metal selected from the group consisting of stainless steel, iron, copper, aluminum, bronze, brass, nickel, chromium, and the like. The respective metal fiber structures 102 and 104 are bonded to the connection member 100. In addition, as shown in FIG. 8 and FIG. 9, a plurality of (for example, eight) through holes 102*a* or 104*a* are formed in each of the metal fiber structures 102 and 104, and the fluid flowing through the flow passage 92 of the pipe 90 can pass through each of the through holes 102*a* and 104*a*. In addition, the phases of the through holes 102*a* and 104*a* provided in the metal fiber structures 102 and 104 fixed to the connection member 100 are different from each other. Furthermore, as shown in FIG. 7, these metal fiber structures 102 and 104 are arranged alternately. Therefore, it is easy to generate turbulent flow in the fluid flowing through the respective through holes 102*a* and 104*a* of the respective metal fiber structures 102 and 104. As the metal fibers forming each of the metal fiber structures 102 and 104, the same type as the metal fibers forming the metal fiber structure 20 shown in FIG. 1 and FIG. 2 is used. Since each of the metal fiber structures 102 and 104 is formed from metal fibers as described above, voids exist inside each of the metal fiber structures 102 and 104. Accordingly, the fluid flowing through the flow passage 92 in the pipe 90 can pass through the inside of each of the metal fiber structures 102 and 104 in addition to the through holes 102*a* and 104*a*.

As shown in FIG. 7 to FIG. 9, a gap is formed at least partially between each of the metal fiber structures 102 and 104 housed in the pipe 90 and the inner surface of the pipe 90. That is, each of the metal fiber structures 102 and 104 exists inside the pipe 90 in a state where the metal fiber structure 102 or 104 is not bonded to the inner surface of the pipe 90. Therefore, an assembly of the respective metal fiber structures 102 and 104 and the connection member 100 is freely movable inside the pipe 90. Accordingly, the fluid flowing through the flow passage 92 in the pipe 90 can pass through the gap formed between each of the metal fiber structures 102 and 104 and the inner surface of the pipe 90. In addition, even when the assembly of the respective metal fiber structures 102 and 104 and the connection member 100 moves inside the pipe 90, since each of the metal fiber structures 102 and 104 is made of metal fibers and has cushioning properties, the inner surface of the pipe 90 can be inhibited from being damaged by the respective metal fiber structures 102 and 104.

The size of the gap between each of the metal fiber structures 102 and 104 housed in the pipe 90 and the inner surface of the pipe 90 is in the range of 10 μm to 500 μm, preferably in the range of 30 μm to 300 μm, and further preferably in the range of 50 μm to 200 μm. The size of the gap between each of the metal fiber structures 102 and 104 housed in the pipe 90 and the inner surface of the pipe 90 refers to the distance between the pipe 90 and each of the metal fiber structures 102 and 104 in a direction orthogonal to the inner surface of the pipe 90. When the size of the gap is set to be not less than 10 μm, an increase in pressure loss can be prevented, so that it can be prevented from being difficult for the fluid to pass through the gap. On the other hand, when the size of the gap is set to be not greater than 500 μm, the fluid can be prevented from flowing through the gap without resistance, so that the heat exchange performance can be enhanced.

In the heat exchanger of the present embodiment shown in FIG. 7 to FIG. 9 as well, similar to the heat exchanger shown in FIG. 1 and FIG. 2, the gap is formed at least partially between each of the metal fiber structures 102 and 104 housed in the pipe 90 as a housing body and the inner surface of the pipe 90. Therefore, the surface area of each of the metal fiber structures 102 and 104 with which the fluid flowing through the pipe 90 comes into contact is increased, so that the thermal conductivity of each of the metal fiber structures 102 and 104 can be increased. In addition, the temperature of the fluid flowing through the pipe 90 can be made uniform. Moreover, in the case where a gap is formed at least partially between each of the metal fiber structures 102 and 104 and the inner surface of the pipe 90, it is easy to generate turbulent flow in the fluid flowing through the pipe 90. In this case, the staying time of the fluid flowing through the pipe 90 is lengthened, so that the heat transfer effect can be enhanced. In the case where a gap is formed at least partially between each of the metal fiber structures 102 and 104 and the inner surface of the pipe 90 as described above, the thermal conductivity of each of the metal fiber structures 102 and 104 can be increased, and the staying time of the fluid flowing through the pipe 90 can be lengthened, thereby enhancing the heat transfer effect, so that the thermal conduction properties for the fluid can be enhanced.

Moreover, in the heat exchanger shown in FIG. 7 to FIG. 9, the assembly of the respective metal fiber structures 102 and 104 and the connection member 100 is freely movable inside the pipe 90. Therefore, it is easier to generate turbulent flow when the fluid flows through the flow passage 92 of the pipe 90. Accordingly, the staying time of the fluid flowing through the pipe 90 is further lengthened, so that the heat transfer effect can be further enhanced.

Moreover, in the heat exchanger shown in FIG. 7 to FIG. 9, the rod-shaped connection member 100 may be rotated by a drive means which is not shown. Accordingly, the respective metal fiber structures 102 and 104 are also rotated about the connection member 100, so that it is easier to generate turbulent flow in the fluid flowing through the flow passage 92 of the pipe 90. In addition, in the case where the fluid flowing through the flow passage 92 of the pipe 90 is a polymer liquid, the polymer liquid can be diffused by rotating the respective metal fiber structures 102 and 104.

Moreover, in the heat exchanger shown in FIG. 7 to FIG. 9, instead of the respective metal fiber structures 102 and 104 being fixed to the connection member 100, the respective metal fiber structures 102 and 104 may be supported by the connection member 100 such that each of the metal fiber structures 102 and 104 is freely slidable relative to the connection member 100 in the right-left direction in FIG. 7. In addition, in this case, the connection member 100 may be provided so as to be fixed in position inside the pipe 90. In such a case as well, since each of the metal fiber structures 102 and 104 is freely slidable relative to the connection member 100, it is easier to generate turbulent flow in the fluid flowing through the flow passage 92 of the pipe 90.

The invention claimed is:

1. A heat exchanger comprising:

a metal fiber structure formed from metal fibers, wherein voids exist between the metal fibers; and a housing body in which the metal fiber structure is housed, wherein a gap is formed at least partially between the metal fiber structure housed in the housing body and an inner surface of the housing body, wherein the metal fiber structure is freely movable inside the housing body along a flowing direction of the fluid flowing inside the housing body.

2. The heat exchanger according to claim 1, wherein an inlet and an outlet for a fluid are formed at both ends of the housing body, respectively, such that the fluid entering an inside of the housing body through the inlet passes through an inside of the metal fiber structure or the gap formed between the metal fiber structure and the inner surface of the housing body and is discharged from the outlet.

3. The heat exchanger according to claim 2, wherein the housing body has a cylindrical shape.

4. The heat exchanger according to claim 1, wherein a material of the metal fibers forming the metal fiber structure and a material of the housing body are different from each other.

5. The heat exchanger according to claim 1, wherein a through hole is formed in the metal fiber structure.

6. The heat exchanger according to claim 5, wherein the through hole extends along the flowing direction of the fluid flowing inside the housing body.

7. The heat exchanger according to claim 1, wherein the metal fibers forming the metal fiber structure are bonded to each other.

8. The heat exchanger according to claim 1, wherein the metal fibers include copper fibers or aluminum fibers.

* * * * *